United States Patent [19]

Harlan

[11] 4,374,882

[45] Feb. 22, 1983

[54] COMPOSITIONS COMPRISING LOW PRESSURE ETHYLENE POLYMERS AND ALKYLENE-ALKYL ACRYLATE COPOLYMERS; AND SPIRAL WOUND HOSE PRODUCTS FABRICATED THEREFROM

[75] Inventor: George M. Harlan, Somerville, N.J.

[73] Assignee: Union Carbide Corporation, Danbury, Conn.

[21] Appl. No.: 332,276

[22] Filed: Dec. 18, 1981

[51] Int. Cl.³ .................... C08L 23/08; C08L 23/00
[52] U.S. Cl. ...................................... 428/36; 525/227
[58] Field of Search .......................... 525/227; 428/36

[56] References Cited

U.S. PATENT DOCUMENTS

| | | | |
|---|---|---|---|
| 2,953,541 | 9/1960 | Pecha et al. | 525/227 |
| 3,248,359 | 4/1966 | Maloney | 525/227 |
| 3,663,663 | 5/1972 | McAda | 525/227 |
| 4,011,382 | 3/1977 | Levine et al. | 526/96 |
| 4,312,918 | 1/1982 | Bostwick | 428/379 |

*Primary Examiner*—Carman J. Seccuro
*Attorney, Agent, or Firm*—James C. Arvantes

[57] ABSTRACT

The disclosure of this application is directed to a composition suitable for use in the fabrication of spiral wound hose comprising a mixture of a substantially linear ethylene polymer having a density of about 0.915 to about 0.935 and a melt index of about 0.1 to about 10.0, produced under low pressures, and an alkylene-alkyl acrylate copolymer containing at least about 19 percent by weight combined alkyl acrylate and having a melt index of about 0.5 to about 6.0.

8 Claims, No Drawings

COMPOSITIONS COMPRISING LOW PRESSURE ETHYLENE POLYMERS AND ALKYLENE-ALKYL ACRYLATE COPOLYMERS; AND SPIRAL WOUND HOSE PRODUCTS FABRICATED THEREFROM

SUMMARY OF THE INVENTION

This invention relates to compositions comprising low pressure ethylene polymers and alkylene-alkyl acrylate copolymers having a combined alkyl acrylate content of at least about nineteen percent by weight; and to spiral wound hose products fabricated therefrom, characterized by improved surface properties and an improved "work life".

BACKGROUND OF THE INVENTION

Fabricators of thermoplastic, spiral wound hose products, which are used in industrial applications such as vacuum cleaners, swimming pool circulation systems and the like, have been plagued by products having a relatively short work life due to a deficiency in one or more of the following properties: tensile modulus, chemical resistance, resistance to flexural fatigue and resistance to environmental stress cracking.

In order to mitigate against such deficiencies, various types of thermoplastics and compositions based thereon have been proposed for use in the fabrication of spiral wound hose products. Fabricators have not been particularly successful, however, in producing spiral wound hose products having a significantly improved "work life".

DETAILED DESCRIPTION OF THE INVENTION

The present invention provides compositions which, in addition to having the properties described below, possess properties of good processability and consequently, can be fabricated into spiral hose products having improved "work life" and improved surface characteristics.

The compositions of this invention are characterized by the following properties:

| | | |
|---|---|---|
| Tensile Modulus psi (ASTMD 882) | = | about 15,000–20,000 |
| Flex Life (Resistance To Flexural Fatigue) | = | >about 300,000 cycles |
| Chemical Resistance | = | >about 500 minutes |
| Environmental Stress Crack Resistance (FO) (ASTMD 1693) | = | >21 days |

The good processability properties of the compositions of this invention is evidenced by the extrusion thereof into well defined extrudates of constant shape and size having smooth exterior surfaces.

The compositions of this invention comprise a mixture of a substantially linear ethylene polymer having a melt index of about 0.1 to about 10.0 and a density of about 0.915 to about 0.935, produced by a low pressure process, and an alkylene-alkyl acrylate copolymer having a combined alkyl acrylate content of at least about 19 percent by weight and a melt index of about 0.5 to about 6.0.

Particularly desirable compositions comprise a mixture of a substantially linear ethylene polymer having a melt index of about 0.3 to about 2.0 and a density of about 0.919 to about 0.925, produced by a low pressure process, and an alkylene-alkyl acrylate copolymer having a combined alkyl acrylate content of about 19 percent by weight and a melt index of about 1.0 to about 2.0.

The alkylene-alkyl acrylate copolymers are present in the compositions in an amount of about 20 to about 90 percent by weight, preferably about 40 to about 70 percent by weight, based on the combined weight of the alkylene-alkyl acrylate copolymer and the ethylene polymer.

Ethylene polymers, suitable for purposes of the present invention, are normally solid ethylene homopolymers and normally solid copolymers of ethylene and $C_3$ to $C_6$ α-olefins such as propylene, butene-1, pentene-1 and hexene-1, having the properties previously described, wherein the copolymers contain at least about 70 percent by weight combined ethylene.

Suitable ethylene polymers are prepared under low pressure, on the order of about 150 to about 300 psi, as described in U.S. Pat. No. 4,011,382 to Isaac J. Levine and Frederick J. Karol patented March 8, 1977.

Density and melt index values noted herein were determined by: ASTMD 1505 (density), ASTMD 1238 (melt index). Combined alkyl acrylate content is conveniently determined by standard infra-red analysis.

The alkylene-alkyl acrylate copolymers are known copolymers produced by reacting an alkene with an alkyl acrylate.

Suitable alkenes are ethylene, propylene, butene-1, hexene-1, heptene-1, octene-1 and the like.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with alkenes to produce the alkylene-alkyl acrylate copolymers of this invention fall within the scope of the following formula:

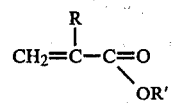

wherein R is hydrogen or methyl and R' is alkyl having one to 8 carbon atoms inclusive. Illustrative of compounds encompassed by this formula are the following: methyl acrylate, ethyl acrylate, ethyl methyacrylate, n-butyl acrylate, n-butyl methacrylate, 2-ethylhexyl acrylate and the like. A particularly desirable polymer is an ethylene-ethyl acrylate copolymer.

If desired, more than one ethylene polymer and also more than one alkylene-alkyl acrylate copolymer can be admixed to produce compositions of this invention.

The compositions of this invention may also contain various additives, for example, to plasticize, to stabilize, to lubricate, to prevent oxidation and to lend color to the compositions. Such additives are well known and may be added to the compositions of this invention in convenient amounts, as is well known to those skilled in the art, without significantly detracting from the beneficial properties of the compositions. Illustrative of such additives are substituted phenols, thio-bisphenols, aromatic amines, dyes, pigments, carbon black, ultra-violet light absorbents, fatty acid amides, waxes, clays, alkaline earth carbonates, rubber and the like.

It is preferred to admix the ethylene polymer and the alkylene-alkyl acrylate copolymer at a temperature sufficiently high to flux the components in order to produce a blend of better uniformity and greater homogeniety. The hot mixing can be satisfactorily carried out, in a tumbler mixer, in a Banbury mixer, on a two-roll mill, in a compounding extruder or other such apparatus.

The following examples further illustrate the present invention and are not intended to limit the scope thereof in any manner.

In each instance, the compositions were formulated as follows:

Ethylene polymer and alkylene-alkyl acrylate copolymer were blended together in a tumbler mixer and the resultant mix hot compounded in a compounding extruder into uniform pellets which were then extruded into sheet material, 0.050 inch thick-6 inches wide. The sheet material was then used to carry out the tests described below, the results of which are reported in Table 1.

Tensile Modulus psi - ASTMD 882
Environmental Stress Crack
Resistance (Fo) - ASTMD 1693
(Fo) refers to the time at which
the first failure of any test
specimen occured using 10% Igepal,slit specimens,
50° C. temperature Flex Life—determined on ½ inch wide, 0.050 inch thick specimens, flexed 180 degrees along the line of orientation at a rate of 300 times per minute until complete rupture occurred. Values reported were averages based on three specimens tested in each instance.

Chemical resistance—determined on ½ inch wide, 0.050 inch thick specimens which were folded on 180 degrees and placed in trichloroethane, which was at a temperature of 38° C. Time for a specimen to crack was noted.

EXAMPLE 1

The composition of this example comprised a mixture of:

44 parts by weight of an ethylene-ethyl acrylate copolymer containing 19.5 percent by weight combined ethyl acrylate and having a melt index of 1.3.

56 parts by weight of a substantially linear ethylene-butene-1 copolymer, produced under low pressure, containing about 10 percent by weight combined butene and having a melt index of 0.8 and a density of 0.920.

The percent by weight ethyl acrylate, based on the combined weight of the ethylene-ethyl acrylate copolymer and the ethylene-butene-1 copolymer, was 8.58.

EXAMPLE 2

The composition of this example comprised a mixture of:

67 parts by weight of an ethylene-ethyl acrylate copolymer containing 19.5 percent by weight combined ethyl acrylate and having a melt index of 1.5.

33 parts by weight of a substantially linear ethylene-butene-1 copolymer, produced under low pressure, containing about 10 percent by weight combined butene and having a melt index of 5 and a density of 0.934.

The percent by weight ethyl acrylate, based on the combined weight of the ethylene-ethyl acrylate copolymer and the ethylene-butene-1 copolymer, was 13.1.

CONTROL 1

The composition of this control comprised a mixture of:

53 parts by weight of an ethylene-ethyl acrylate copolymer containing 15 percent by weight combined ethyl acrylate and having a melt index of 1.5.

47 parts by weight of the ethylene-butene-1 copolymer of Example 1.

The percent by weight ethyl acrylate, based on the combined weight of the ethylene-ethyl acrylate copolymer and the ethylene-butene-1 copolymer, was 7.95.

CONTROL 2

The composition of this control comprised a mixture of:

80 parts by weight of the ethylene-ethyl acrylate copolymer of Control 1.

20 parts by weight of the ethylene-butene-1 copolymer of Example 2.

The percent by weight ethyl acrylate, based on the combined weight of the ethylene-ethyl acrylate copolymer and the ethylene-butene-1 copolymer, was 12.0.

TABLE 1

|  | EXAMPLE 1 | CONTROL 1 | EXAMPLE 2 | CONTROL 2 |
|---|---|---|---|---|
| Tensile Modulus (psi) | 17,300 | 18,900 | 14,800 | 13,300 |
| Flex Life (cycles) | 389,000 | 125,000 | 296,000 | 170,000 |
| Chemical Resistance (min.) | >1,500 | >1,500 | >1,500 | 35 |
| Environmental Stress Crack Resistance, Fo | >21 days | >21 days | >21 days | 4–7 days |
| Percent by Weight Ethyl acrylate | 8.58 | 7.95 | 13.1 | 12.0 |

As stated, the compositions of this invention find utility in the fabrication of spiral wound hose. Spiral winding is a common means of fabricating hoses and involves continuously wrapping one or two continuous lengths of constant cross-section profile extrusions around a mandrel of specific diameter to form a growing length of tubing. Each wrap partially overlaps the previous wrap and the seam is adhered with a hot melt adhesive, applied to the profiles immediately proceding contact with the mandrel.

What is claimed is:

1. A composition comprising a subsequently linear ethylene polymer having a melt index of about 0.1 to about 10.0 and a density of about 0.915 to about 0.935 and in an amount of about 20 to about 90 percent by weight, an alkylene-alkyl acrylate copolymer having a combined alkyl acrylate content of at least about 19 percent by weight and having a melt index of about 0.5 to about 6.0.

2. A composition comprising a substantially linear ethylene polymer having a melt index of about 0.3 to about 2.0 and a density of about 0.919 to about 0.925 and in an amount of about 40 to about 70 percent by weight, an alkylene-alkyl acrylate copolymer containing about 19 percent by weight combined alkyl acrylate and having a melt index of about 1.0 to about 2.0.

3. A composition as defined in claim 1 wherein the ethylene polymer is an ethylene-butene-1 copolymer.

4. A composition as defined in claim 1 wherein the alkylene-alkyl acrylate copolymer is an ethylene-ethyl acrylate copolymer.

5. A composition as defined in claim 1 wherein the ethylene polymer is an ethylene-butene-1 copolymer and the alkylene-alkyl acrylate copolymer is an ethylene-ethyl acrylate copolymer.

6. A composition as defined in claim 2 wherein the ethylene polymer is an ethylene-butene-1 copolymer and the alkylene-alkyl acrylate copolymer is an ethylene-ethyl acrylate copolymer.

7. A spiral wound hose produced from the composition defined in claim 1.

8. A spiral wound hose produced from the composition defined in claim 2.

* * * * *

UNITED STATES PATENT AND TRADEMARK OFFICE
CERTIFICATE OF CORRECTION

PATENT NO. : 4,374,882

DATED : February 22, 1983

INVENTOR(S) : George M. Harlan

It is certified that error appears in the above—identified patent and that said Letters Patent is hereby corrected as shown below:

Column 1, line 51, "(FO)" should read -- (Fo) --

Column 1, line 55, "is" should read -- are --

Column 2, line 50, "methyacrylate" should read -- methacrylate --

Column 4, line 44, "proceding" should read -- preceding --.

Claim 1, line 1, "subsequently" should read -- substantially --

Signed and Sealed this

First Day of May 1984

[SEAL]

Attest:

GERALD J. MOSSINGHOFF

Attesting Officer

Commissioner of Patents and Trademarks